United States Patent
Hu (10) Patent No.: US 6,275,263 B1
(45) Date of Patent: Aug. 14, 2001

(54) MULTI-FUNCTION USB VIDEO CAPTURE CHIP USING BUFFERLESS DATA COMPRESSION

(75) Inventor: Xiaoping Hu, San Jose, CA (US)

(73) Assignee: Sigma Designs, Inc., Milpitas, CA (US)

( * ) Notice: Subject to any disclaimer, the term of this patent is extended or adjusted under 35 U.S.C. 154(b) by 0 days.

(21) Appl. No.: 09/606,372

(22) Filed: Jun. 28, 2000

Related U.S. Application Data (63) Continuation of application No. 08/943,772, filed on Oct. 6, 1997.

(51) Int. Cl.[7] .............................. H04N 11/02; H04N 7/01
(52) U.S. Cl. .......................................... 348/453; 348/441
(58) Field of Search .................................. 348/441, 443, 348/444, 446, 449, 453, 455, 456, 552, 554, 392, 398, 555, 391, 393, 394, 395; 358/431, 448; 382/233, 250, 261, 299, 300; H04N 11/02, 7/01

(56) References Cited

U.S. PATENT DOCUMENTS

| | | | |
|---|---|---|---|
| 4,675,612 | 6/1987 | Adams et al. | 328/63 |
| 4,713,621 | 12/1987 | Nakamura et al. | 328/55 |
| 5,528,309 | 6/1996 | Nguyen | 348/587 |
| 5,574,572 | 11/1996 | Malinowski et al. | 358/451 |
| 5,638,130 | 6/1997 | Linzer | 348/445 |
| 5,650,824 | 7/1997 | Huang | 348/453 |
| 5,719,511 | 2/1998 | Le Cornec et al. | 327/146 |
| 5,832,120 | 11/1998 | Prabhakar et al. | 382/233 |
| 5,982,459 | 11/1999 | Fandrianto et al. | 348/845.2 |

FOREIGN PATENT DOCUMENTS

WO 9210911   6/1992   (WO) .

OTHER PUBLICATIONS

Tsai Y T : "Color Image Compression for Single–Chip Cameras" IEEE Transactions on Electron Devices, vol. 38, No. 5, May 1, 1991, pp. 1226–1232, XP000200683. see abstract; figures 1, 6.

*Primary Examiner*—Michael Lee
(74) *Attorney, Agent, or Firm*—Swernofsky Law Group (57) ABSTRACT

A method and system for capturing live video signal data using bufferless data compression is disclosed. Live video signal data is vertically scaled. A 4:2:2 to 4:2:0 color format conversion is performed simultaneous with the vertical scaling step. A one-dimensional bufferless discrete cosine transform is performed on the scaled live video signal data to create a plurality of scaled DCT coefficients. Each of the plurality of scaled DCT coefficients are then Huffman coded. Each of the Huffman encoded DCT coefficients may then be sent via a USB interface to a USB bus.

7 Claims, 8 Drawing Sheets

MULTI-FUNCTION USB VIDEO CAPTURE CHIP USING BUFFERLESS DATA COMPRESSION

This is a continuation of copending application Ser. No. 08/943,772 filed Oct. 6, 1997.

BACKGROUND OF THE INVENTION

1. Field of the Invention

The present invention relates to bufferless compression of video data.

2. The Prior Art

With the development of multi-media systems, the prospect of inputting live video into a computer system has become common. Video capture chips are used for capturing still image or live video, and may be used together with a video sensor and signal processing circuit to create a video camera. Although it would be desirable to include a USB interface in the video capture chip to interface with a computer, the USB interface has a much smaller bandwidth than the camera generates.

At present, a USB interface has a bandwidth of 12 M bits per second, and only 8 M bits per second can be allocated to a single isochronous channel. In order to capture live video at a high resolution, the image data could be compressed. For example, a data rate for Common Interchange Format (CIF) resolution video (352×288) in 4:2:0 format at a rate of 30 frames per second is approximately 35.6 M bits/s. One way to transmit this data across a USB using a 8 M bits/s channel is to compress this data at a compression ratio of approximately 4.5:1. However, known lossless compression engines are not generally this effective, and all lossy compression engines utilize an intermediate buffer for compression of video data. This intermediate buffer substantially increases the manufacturing costs of such a system. Accordingly, hardware costs could be substantially reduced if this intermediate buffer were eliminated. Moreover, less CPU power is required to decompress the data.

During MPEG I and MPEG II encoding, each macroblock is processed. Each macroblock comprises a plurality of pixels, each of which is defined by color space components. A color space is a mathematical representation for a color. For example, RGB, YIQ, and YUV are different color spaces which provide different ways of representing a color which will ultimately be displayed in a video system. A macroblock in YUV format contains data for all Y, U, V components. Y is the luma component, or black and white portion, while U and V are color difference components.

Pixels in each macroblock are traditionally stored in blocks since they are compressed. Each block comprises 8 lines, each line having 8 pixels. Three types of macroblocks are available in MPEG 2. The 4:2:0 macroblock consists of four Y blocks, one U block, and one V block. A 4:2:2 macroblock consists of four Y blocks, two U blocks, and two V blocks. A 4:4:4 macroblock consists of four Y blocks, four U blocks, and four V blocks.

During encoding, a Discrete Cosine Transform (DCT) is performed on each 8×8 lock of pixels within each macroblock, resulting in an 8×8 block of horizontal and vertical frequency coefficients. Typically, the DCT process is two dimensional, where DCT is performed on each row and column of pixels. However, the two dimensional process is difficult to perform without an intermediate buffer to store 8 lines of video data. It would be desirable to perform the DCT process without this intermediate buffer, resulting in an increase in efficiency of the DCT process and a decrease in hardware costs.

Resolution of video is often different from the resolution of the computer display on which the video will be displayed. In order to display the video on various computer displays, the video resolution often should be scaled to fit within a desired window, such as by vertical and horizontal scaling. Scaling down can be performed by averaging, while scaling up can be accomplished by interpolation.

Various color formats have been developed for use with image and video encoding and decoding. To facilitate the transfer of data, most MPEG II video encoders accept various video formats, such as the 4:2:2 YUV video format, and use the 4:2:0 format for data storage. Therefore, color format conversion from the 4:2:2 format to the 4:2:0 format is known to be performed. In known systems, color format conversion and scaling are performed in two separate processes. It would be extremely advantageous if vertical scaling and color format conversion could be combined into one process. Through combining these two processes, efficiency of the video capture chip could be improved with a reduced hardware cost.

Accordingly, it would be desirable to provide a method and system for capturing still images or live video with improved efficiency and reduced hardware costs. These advantages are achieved in an embodiment of the invention in which color format conversion and vertical scaling are performed in one process, in which a one-dimensional DCT process is performed without an intermediate buffer, and in which Huffman coding is tailored to the particular DCT.

BRIEF DESCRIPTION OF THE INVENTION

The present invention provides a video capture chip with a USB interface. When combined with a video sensor and signal processing circuit, the video capture chip is capable of capturing live video and still images, and sending the data through a USB to a computer. With the addition of application software, the present invention may be used in a video camera, surveillance watcher, scanner, copier, fax machine, digital still picture camera, or other similar device.

According to a first aspect of the present invention, a method for combining vertical scaling and color format conversion is disclosed. Vertical scaling and 4:2:2 to 4:2:0 color format conversion are simultaneously performed on incoming Y, U, and V data. According to a presently preferred embodiment of the present invention, each byte of the Y, U, and V data are separated. A scaling factor is determined, the scaling factor indicating a number of bytes to average. When the scaling factor is equal to 1, a 2:1 scale down is performed for each U and V byte. When the scaling factor is equal to f, where f is greater than 1, a 2f:1 scale down is performed for each U and V byte when the scaling factor is equal to f. In addition, when the scaling factor is equal to f, where f is greater than 1, an f:1 scale down is performed for each Y byte. Through the reduction of the vertical scaling and color format conversion into one process, the line buffer size and logical gate count may be reduced by half.

According to a second aspect of the present invention, a method for performing a one dimensional DCT on a line of pixels to create a DCT coefficient y(u) is disclosed. According to a presently preferred embodiment of the present invention, a sequence of pixels is accepted. A cosine operation is then performed on adjacent sets of the sequence of pixels to generate a sequence of one dimensional DCT coefficients. This is accomplished without storing the sequence in a buffer through use of a register. Through elimination of the buffer required in the traditional two dimensional DCT, efficiency is improved, and manufacturing costs are substantially reduced.

According to a third aspect of the present invention, a method for compressing DCT coefficients, or other data, is disclosed to offset the lower compression ratio resulting from the one dimensional DCT. According to a presently preferred embodiment of the present invention, a plurality of DCT coefficients are accepted. A pattern code is then generated for the plurality of DCT coefficients. The pattern code comprises a plurality of bits, each one of the plurality of bits corresponding to one of the plurality of DCT coefficients. Each one of the plurality of bits is 0 when the DCT coefficient is 0, and is otherwise 1. Nonzero DCT coefficients are identified using the pattern code. Each zero DCT coefficient is encoded with zero bits. A coefficient table is prepared, the coefficient table having a plurality of code pairs, each of the plurality of pairs having a length code and a Huffman code. In addition, a pattern table is prepared, the pattern table having a plurality of code pairs, each of the plurality of pairs having a length code and a Huffman code. A table lookup is performed for each non-zero DCT coefficient within the coefficient table. Similarly, a table lookup is performed for each pattern code within the pattern table. Optimum compression is achieved since a majority of the non-zero coefficients have common values which can be compressed through Huffman encoding.

Therefore, the present invention provides a method and system for vertically scaling the live video signal data and performing a 4:2:2 to 4:2:0 color format conversion simultaneous with the vertical scaling step. Moreover, a one-dimensional bufferless discrete cosine transform is performed on the scaled live video signal data to create a plurality of scaled DCT coefficients. Each of the plurality of the scaled DCT coefficients is then Huffman encoded.

DETAILED DESCRIPTION OF THE PREFERRED EMBODIMENTS

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

Figure 1:
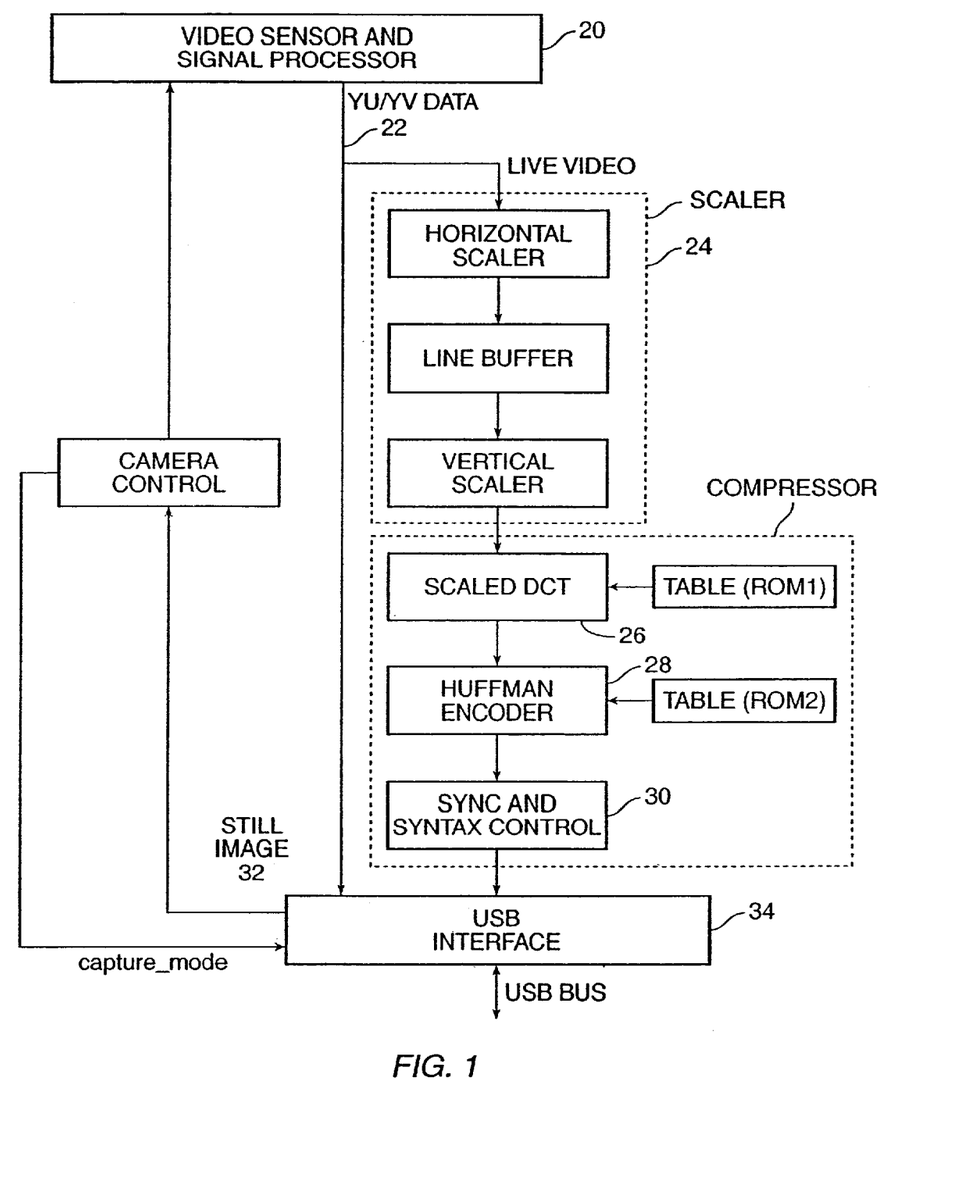
FIG. 1 illustrates a USB video capture chip according to a presently preferred embodiment of the present invention.

Referring first to FIG. 1, a USB video capture chip according to a presently preferred embodiment of the present invention is shown. A video sensor and signal processor 20 provides color space component data 22 to the USB video capture chip. The USB video capture chip comprises a scaler 24, a DCT module 26, a Huffman coding module 28, and a sync and syntax control module 30. According to a presently preferred embodiment of the present invention, still image data 32 bypasses the video capture chip and goes directly to a USB interface 34 for transmitting data to a CPU. However, live video is compressed by the USB video capture chip before being sent to the USB interface 34. A software driver may then decompress the video data and send the decompressed data to an application.

Figure 2:
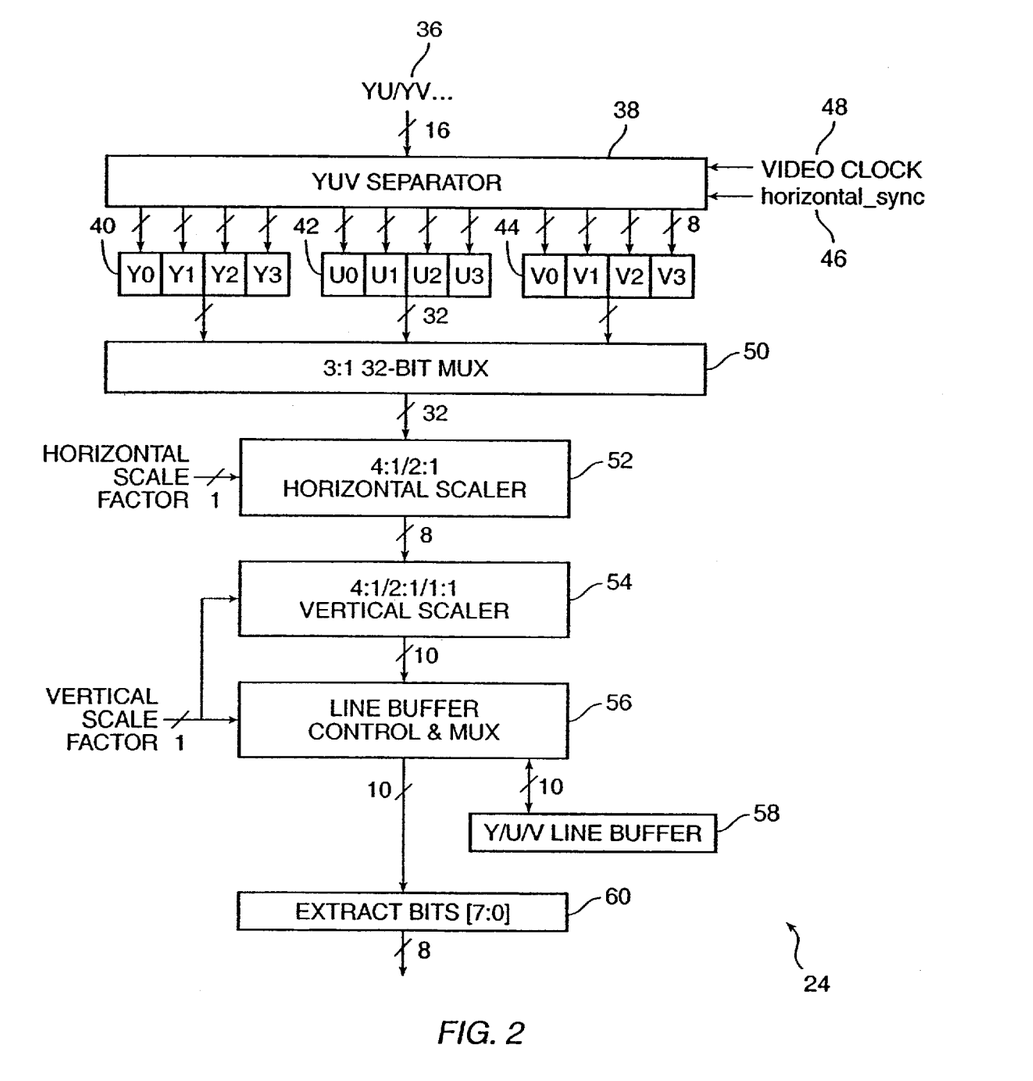
FIG. 2 illustrates a scaler according to a presently preferred embodiment of the present invention.

Referring now to FIG. 2, a scaler according to a presently preferred embodiment of the present invention is shown. Each line of incoming color space component data 36 comprises first color space component data, second color space component data, and third color space component data. According to a presently preferred embodiment of the present invention, the first, second, and third color space component data correspond to Y, U, and V data, respectively, and each line of 4:2:2 YUV data is split by a color space component separator, or YUV separator 38 into Y 40, U 42, and V 44 buffers. However, one of ordinary skill in the art will readily recognize that the present invention may be easily modified without undue experimentation to accommodate other color space components and formats. According to a presently preferred embodiment, the Y, U and V buffers each comprise a four-byte buffer. A horizontal sync signal 46 indicates the start of a new horizontal scan line of a video frame. Scaling is synchronized with a video clock signal 48. Tracking of the Y, U, and V components is performed by counting each byte received at the horizontal sync signal 46. According to a presently preferred embodiment, input data is interleaved YUYV data. Therefore, even bytes comprise Y bytes, while odd bytes comprise U or V bytes. The separator may be implemented with a multiplexer, or equivalent means for separating the Y, U and V bytes.

The Y, U, and V data is then multiplexed by a 3:1 32-bit multiplexer 50. The multiplexer 50 controls buffer selection and sends 4 bytes of Y, U or V data to be scaled. When the Y buffer 40 is selected, the Y buffer 40 is accessed twice before switching to the U 42 or V 44 buffer. The multiplexed data is then processed by a horizontal scaler 52 and a vertical scaler 54 according to the present invention. The horizontal 52 and vertical 54 scalers may be implemented in pipeline.

The horizontal scaler 52 is adapted for performing a 2:1 or 4:1 averaging operation on each color component, depending on a horizontal scale factor. When the horizontal scale factor is 2, two bytes are selected from one of the four byte buffers 40–44. When the horizontal scale factor is 4, all four bytes are selected from one of the four byte buffers 40–44. The selected bytes are then averaged and rounded. The horizontal scaler 52 then outputs a single averaged byte.

The vertical scaler 54 is adapted for performing vertical scaling and color format conversion on the horizontally scaled data in a single process according to the present invention. A 2f:1 scale down on each byte of the U and V components is performed for a scaling factor equal to f. A f:1 scale down is performed on each byte of the Y component where f is an integer greater than 1, since no scaling is required where f is equal to 1. This scaled data is then sent to a DCT module.

A line buffer control module 56 controls data flow to a YUV line buffer, or DCT buffer 58. According to a presently preferred embodiment of the present invention, the line buffer control module 56 comprises a multiplexer which dispatches data to the YUV line buffer, or DCT input buffer 58, for use by a DCT module. Moreover, the YUV line buffer 58 may be used to store intermediate accumulation results for the vertical scaler 54. According to a presently preferred embodiment of the present invention, data is dispatched in 10 bit blocks. However, one of ordinary skill in the art will readily recognize that blocks comprising greater or fewer bits may be dispatched. The multiplexer dispatches YUV data from the vertical scaler to a Y, U, or V block, respectively, within the YUV line buffer. The DCT module may then process selected bytes 60 within the YUV line buffer.

Figure 3:
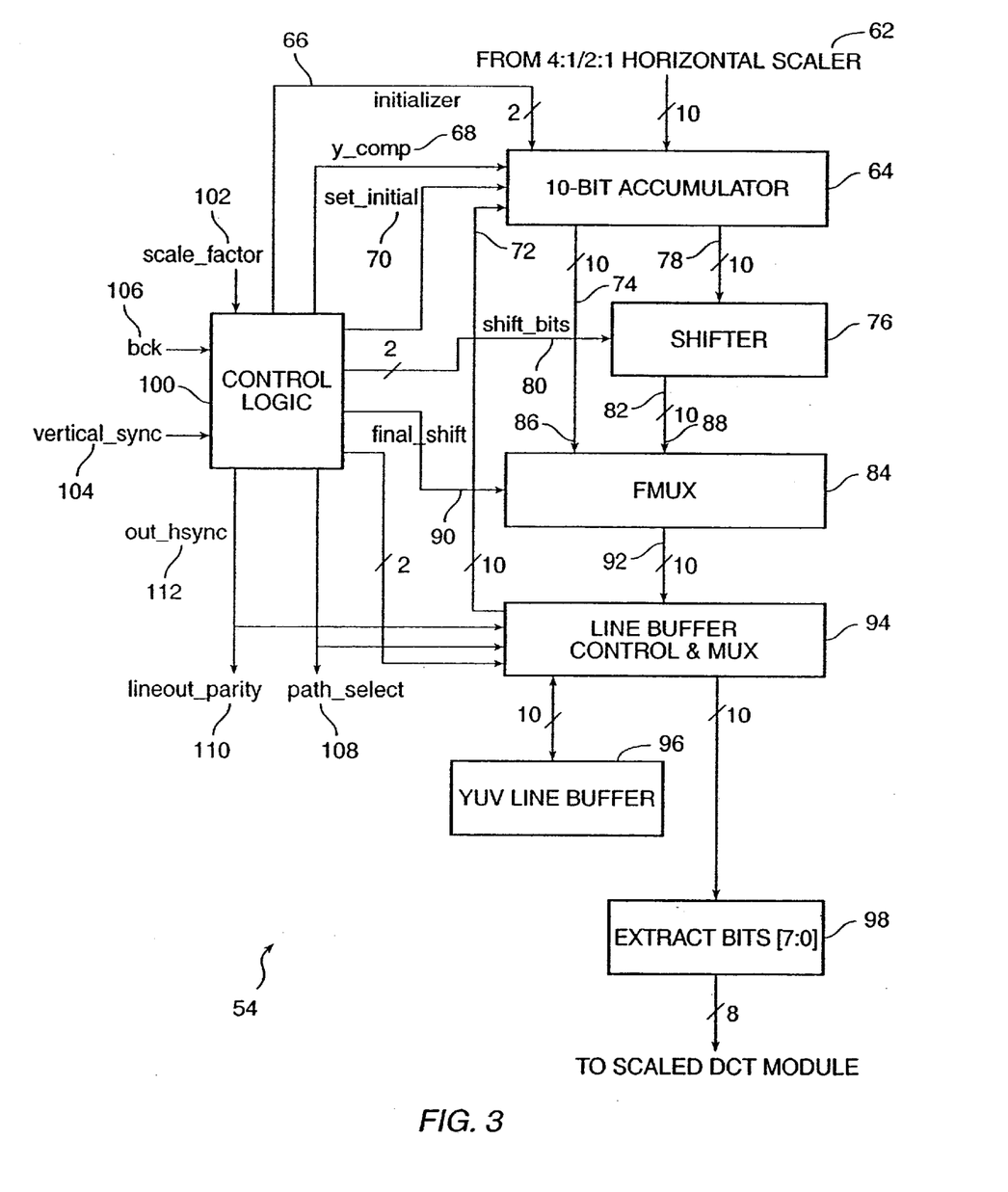
FIG. 3 illustrates an implementation of the vertical scaler according to a presently preferred embodiment of the present invention.

Referring now to FIG. 3, an implementation of the vertical scaler 54 according to a presently preferred embodiment of the present invention is presented. According to the present invention, a means for vertically scaling the live video signal data and means for performing a 4:2:2 to 4:2:0 color format conversion simultaneous with the vertical scaling step are provided. Incoming color space component data 62 is obtained from the horizontal scaler.

According to a preferred embodiment, a means for adding vertically aligned component values is provided. A 10-bit accumulator 64 performs adding required during averaging of this color space component data to produce a sum. An accumulator 64 is provided having a first input operatively coupled to the incoming color space component data 62, a second input operatively coupled to an initializer value 66 for rounding accumulated data, a third input operatively coupled to a component signal 68 adapted for selecting the first, second, or third color space component to be scaled, a fourth input operatively coupled to a set_initial signal 70 used to reset the accumulator, a fifth input 72 for receiving intermediate accumulation results, and an output 74 producing the sum of the color space component data to be averaged. Rounding is performed by adding an initializer value to the sum.

In addition, a shifting means is provided. A shifter 76 is provided having a first input 78 operatively coupled to the accumulator output, a second input 80 indicating a number of bits to shift the sum right, and an output 82. Thus, the shifter shifts the sum right by a number of bits equal to shift_bits to divide the sum by a multiple of 2 to produce an averaged sum.

A multiplexing means, multiplexer FMUX 84, is operatively coupled to the shifter 76 and accumulator 64 for selecting YUV data to be sent to a line buffer control module. The multiplexer 84 includes a first input 86 operatively coupled to the accumulator output, a second input 88 operatively coupled to the shifter output, a select line 90 operatively coupled to a final_shift signal indicating when a final shift is to be performed, and an output 92, the select line 90 selecting the second input 88 when the final shift is to be performed, and otherwise selecting the first input 86.

A buffer control module 94 is provided for storing the multiplexer output, the buffer control module 94 adapted for providing the multiplexer output to a DCT module when the final_shift signal indicates the final shift is to be performed, and otherwise providing the multiplexer output to the fifth accumulator input. Thus, the line buffer control module is operatively coupled to the accumulator to store intermediate accumulation results. The buffer control module 94 is adapted for storing the multiplexer output in a YUV line buffer 96. An extract bits module 98 sends this data to the DCT module.

Control logic 100 generates necessary control signals for the accumulator 64, shifter 76, multiplexer 84 and line buffer control module 94. For example, the number of bits to shift the data, shift_bits, is sent to the shifter 76. The control logic is regulated by a scaling factor 102, a vertical_sync signal 104 indicating the start of a frame, and the rate 106 the vertical scaler receives bytes from the horizontal scaler. The scaling factor 102 is an integer, and will generally be 1 or 2.

During vertical scaling, the control logic 100 generates three signals for use by the accumulator 64. First, the initializer value is generated indicating a value to initialize the accumulator 64 for rounding. Second, a y_comp signal indicates that the present component being scaled is the Y component. For example, if the component is a Y component, the y_comp signal is 1. In all other instances, the y_comp signal is 0. As described above, this is performed by clock counting. Third, a set_initial signal is used to reset the accumulator 64 to the initializer value at the beginning of scaling each Y, U, or V component. According to a presently preferred embodiment of the present invention, the initializer value=shift_bits=scale_factor minus y_comp.

Data flow during vertical scaling varies according to the scale factor. The control logic 100 generates a two bit path_select signal 108 indicating the direction of the data flow, since data may flow in three directions: from the FMUX 84 to the line buffer 96, from the line buffer 96 to the extract bits module 98, and from the line buffer 96 to the accumulator 64. During 1:1 scaling, data flows from the FMUX 84 to the line buffer 96. During 2:1 scaling, data flows from the FMUX 84 to the line buffer 96 for even lines. For odd lines, data flows sequentially from the line buffer 96 to the extract bits module 98, and from the line buffer 96 to the accumulator 64. During 4:1 scaling, four input lines are processed. For the first line, data flows from the FMUX 84 to the line buffer 96. For the second and third lines, data flows from the line buffer 96 to the accumulator 64 and from the FMUX 84 to the line buffer 96, sequentially. For the fourth line, data flows sequentially from the line buffer 96 to the accumulator 64 and from the line buffer 96 to the extract bits module 98. According to a preferred embodiment, the control logic 100 sends a final_shift signal to the FMUX 84 indicating when the accumulation process is complete. Therefore, when final_shift is 1, the FMUX 84 selects the output of the shifter 76, and otherwise selects the output of the accumulator 64. The control logic 100 further generates a lineout_parity 110 indicating a line number of the line after scaling is completed, as well as a signal 112 indicating a start of a new horizontal line. During DCT data access, data flows from the line buffer 96 to an extract bits module 98. According to a presently preferred embodiment, the lowest 8 bits from the 10-bit line buffer data are extracted.

Figure 4:
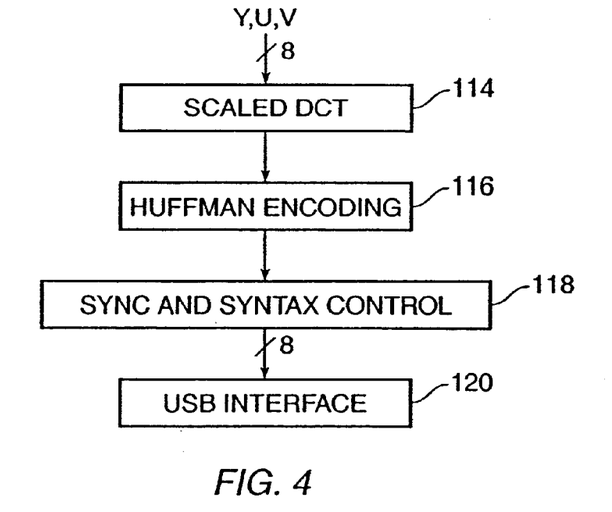
FIG. 4 illustrates a compression engine according to the present invention.

Referring now to FIG. 4, a compression engine according to the present invention is presented. The compression engine comprises a one dimensional DCT 114 integrated with quantizers, a Huffman encoding block 116, and a syntax protocol and sync control block 118 coupled to the USB interface 120. The compression engine encodes each frame on a scanline basis. Each line comprises 8-pixel segments. According to a presently preferred embodiment of the present invention, each frame starts with a picture_start_code and each scanline starts with a line_start_code. The line_start_code distinguishes between even lines comprising Y components only and odd lines comprising Y, U and V components.

Figure 5:
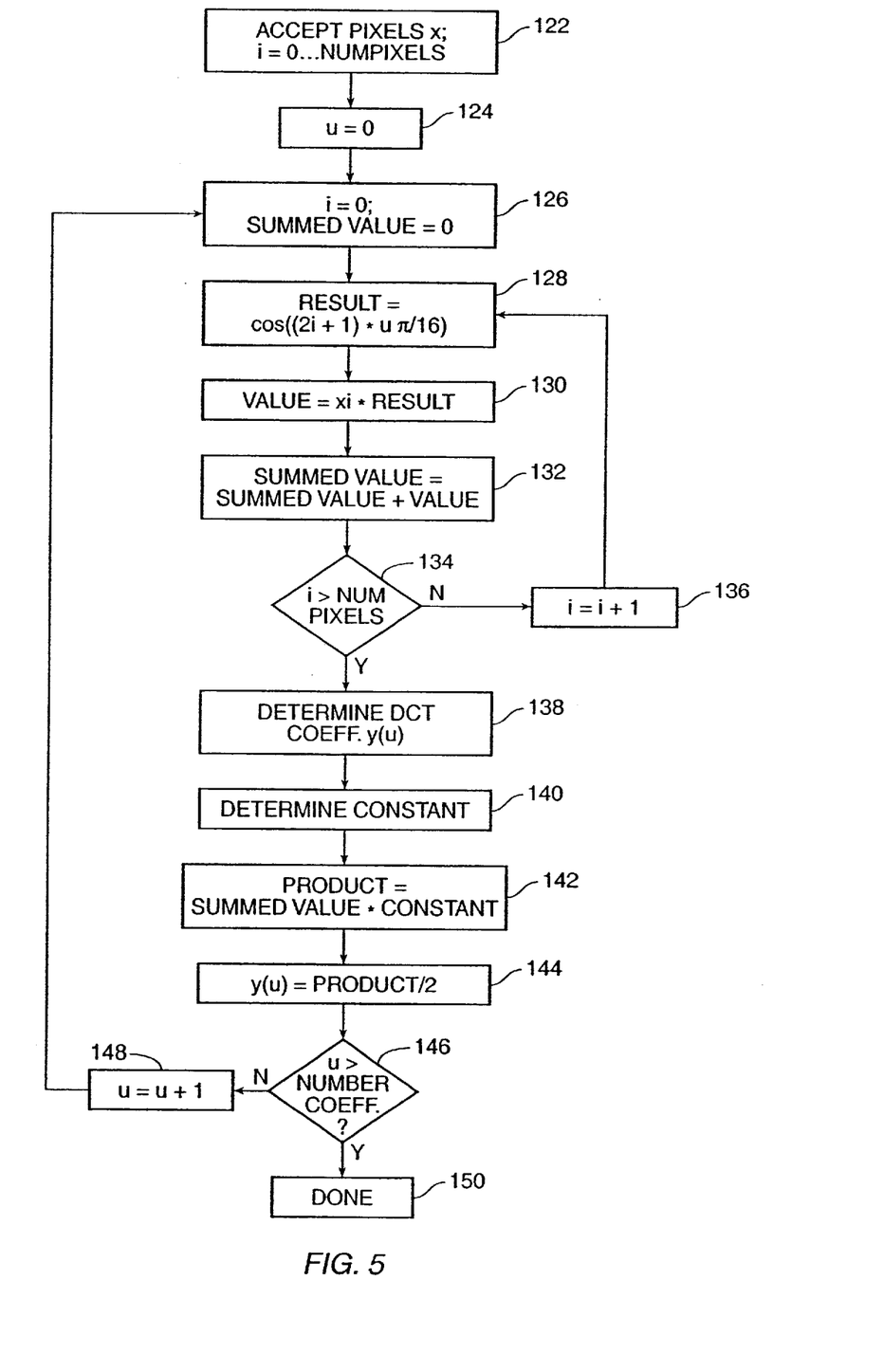
FIG. 5 is a flow diagram illustrating a method for performing a one-dimensional DCT according to a presently preferred embodiment of the present invention.

Referring now to FIG. 5, a flow diagram illustrating a method for performing a one-dimensional DCT according to a presently preferred embodiment of the present invention is presented. A means for performing a one-dimensional bufferless discrete cosine transform on the scaled live video signal data to create a plurality of scaled DCT coefficients is provided. According to a presently preferred embodiment of the present invention, the one dimensional DCT is performed on each line of 8 pixels to create a DCT coefficient $y(u)$. First, a plurality of pixels is accepted at step 122, each of the plurality of pixels $x_i$ designated by an integer i, where i is an integer selected from the group consisting of 0, 1, 2, 3, 4, 5, 6, and 7. At step 124, a DCT coefficient selector, u, is initialized. In addition, a pixel is selected and intermediate values are initialized at step 126. Next, at step 128, a cosine operation is performed on $((2i+1) * u\pi/16)$ to create a result, where u is an integer selected from the group consisting of 0, 1, 2, 3, 4, 5, 6, and 7, and where u designates a DCT coefficient. Next, at step 130, the pixel $x_i$ and the result of the cosine operation are multiplied to create a value for summation. In addition, the value for summation is successively added to create a summed value at step 132. If it is determined at step 134 that steps 128–132 have not been performed for all pixels, a next pixel is select at step 136, and steps 128–132 are repeated. Once calculations are performed for all pixels, a DCT coefficient $y(u)$ is determined at step 138. First, at step 140, a constant is determined, the constant being $1/\sqrt{2}$ when u is 0, the constant otherwise being 1. The summed value is multiplied by the constant to create a product at step 142. The product is then divided by 2 at step 144. The steps of performing and multiplying are repeated for each of the plurality of pixels until all DCT coefficients u are determined to be calculated at step 146. These steps are performed for each DCT coefficient u at step 148 until the process is completed at step 150.

According to a presently preferred embodiment of the present invention, the scaled DCT is further divided by a quantizer. A quantizer $q(u)$ corresponding to the DCT coefficient $y(u)$ is selected, where u is an integer selected from the group consisting of 0, 1, 2, 3, 4, 5, 6, and 7, where the quantizer $q(0)$ is 5.656, the quantizer $q(1)$ is 11.0, the quantizer $q(2)$ is 13.0, the quantizer $q(3)$ is 15.0, the quantizer $q(4)$ is 17.0, the quantizer $q(5)$ is 19.0, the quantizer $q(6)$ is 21.0, and the quantizer $q(7)$ is 23.0. The DCT coefficient $y(u)$ is then divided by the quantizer $q(u)$. According to a preferred embodiment, the method for performing a one-dimensional DCT may be implemented in software or firmware, as well as in programmable gate array devices, ASIC and other hardware.

Figure 6:
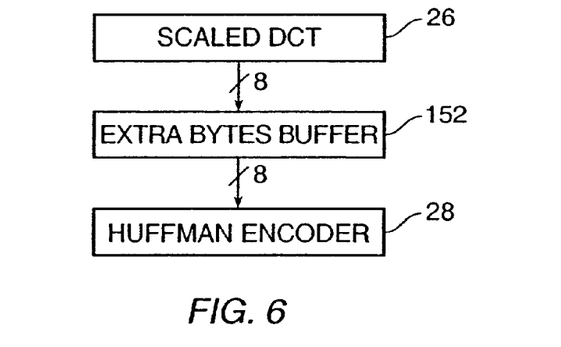
FIG. 6 illustrates an interface between a scaled one dimensional DCT and Huffman Encoder according to the present invention.

Referring now to FIG. 6, an interface between the scaled one dimensional DCT 26 and Huffman Encoder 28 shown in FIG. 1 is illustrated. The one dimensional DCT 26 outputs each DCT coefficient, which is stored in a buffer 152 for use by the Huffman Encoder 28. The buffer 152 is provided to store accumulated DCT coefficients, since according to a presently preferred embodiment, the Huffman Encoder 28 uses a greater number of clock cycles than the DCT module to process each 8 bytes of DCT coefficients. According to a presently preferred embodiment of the present invention, each DCT coefficient byte is written to the buffer in synchronization with a DCT clock when enabled by a WRITE_ENABLE signal. The Huffman Encoder reads each byte from the buffer when enabled by a READ_ENABLE signal. The READ_ENABLE signal is enabled during coefficient selection, and disabled during Huffman encoding.

Figure 7:
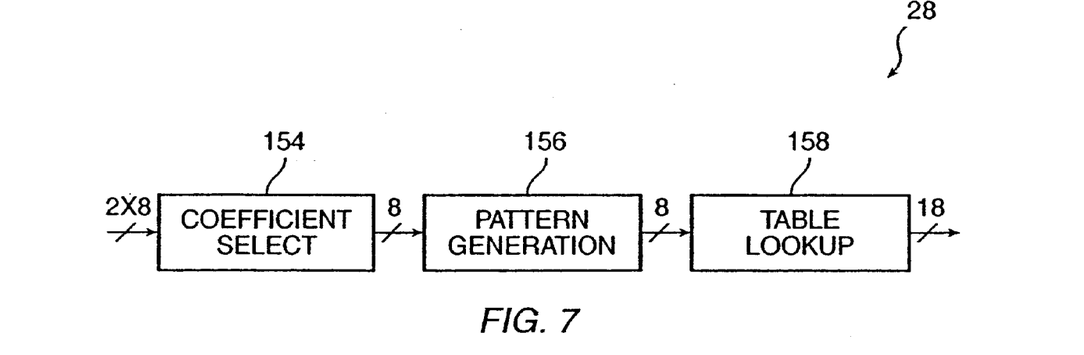
FIG. 7 illustrates a Huffman Encoder according to a presently preferred embodiment of the present invention.

Referring now to FIG. 7, a Huffman Encoder according to the present invention is illustrated. A coefficient to be Huffman encoded is selected at 154. Next, pattern code generation is performed at 156. Finally, table lookup is performed at 158. Therefore, a means for Huffman encoding each of the plurality of scaled DCT coefficients includes a means for selecting a coefficient to be Huffman encoded, means for pattern code generation, and table lookup means.

Figure 8:
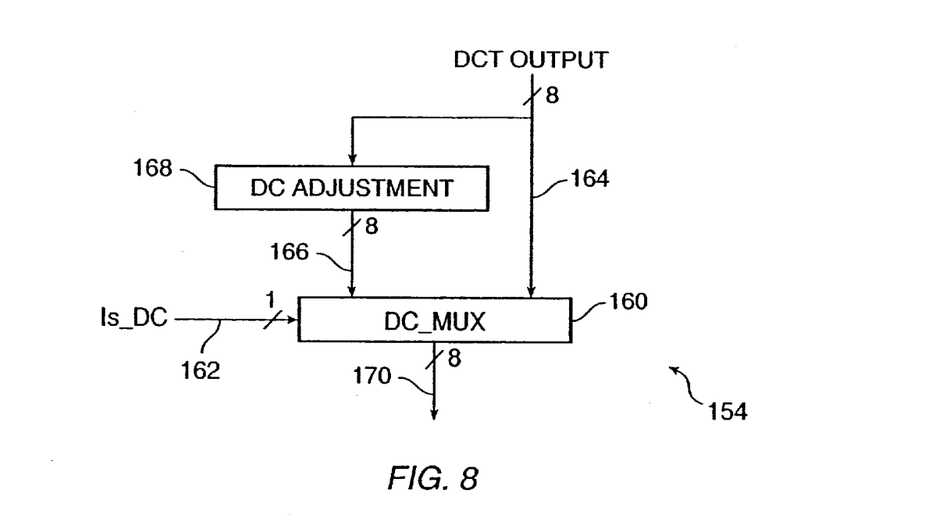
FIG. 8 illustrates a coefficient selection module of the Huffman Encoder according to a presently preferred embodiment of the present invention.

Referring now to FIG. 8, coefficient selection means of the Huffman Encoder according to a presently preferred embodiment of the present invention is presented. A multiplexer DC_MUX 160 has a select line 162, a first input 164 coupled to an incoming DCT coefficient received from the one dimensional DCT output, a second input 166 coupled to a DC Adjustment block 168, and an output 170. When the incoming DCT coefficient is a DC component $Z_0$, the select line 162 is 1. In all other instances, the select line 162 is 0. When the select line 162 is 1, the multiplexer DC_MUX 160 selects the second input 166 and places it at the multiplexer output 170. When the select line 162 is 0, the first input 164 is selected and passed through to the multiplexer output 170.

Figure 9:
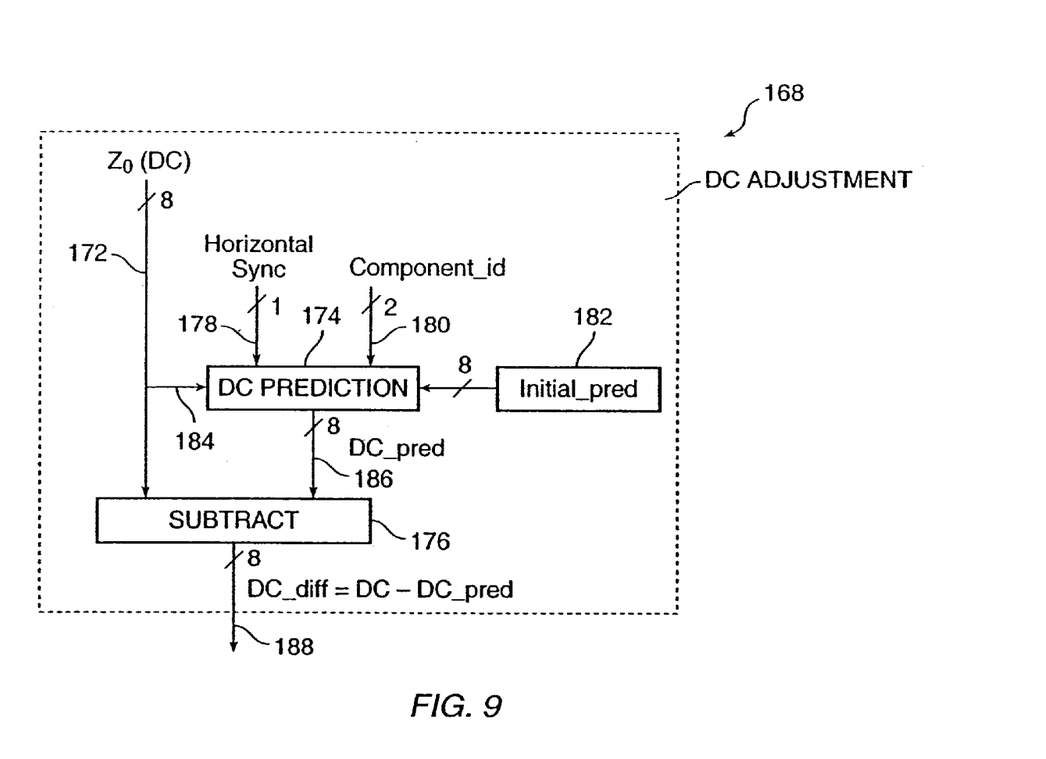
FIG. 9 illustrates a presently preferred embodiment of DC adjustment performed during the coefficient selection.

Referring now to FIG. 9, a DC component adjustment block according to a presently preferred embodiment of the present invention is illustrated. When the incoming DCT coefficient is a DC component 172, the DC component 172 is adjusted. The DC adjustment block 168 includes a DC prediction block 174 and a subtraction block 176.

The DC prediction block 174 includes a horizontal sync input 178 indicating the start of a new line, a component_id input 180 indicating a Y, U or V component, an initial_pred input 182 used for initialization, a DC component input 184 providing the Y, U, or V component as indicated by the component_id input 180, and a DC_pred output 186. According to a presently preferred embodiment, a plurality of registers is provided for initialization, with each one of the plurality of registers allocated for each of the Y, U, and V components. When the horizontal sync input 178 indicates the start of a new line, the DC prediction block 174 initializes each of the plurality of registers with the initial_pred input 182 value. According to a presently preferred embodiment of the present invention, the initial_pred input value is 64.

The subtraction block 176 has a first input coupled to the DC component input 172, a second input coupled to the DC prediction block output 186, and an output 188. For each 8-byte Y, U, and V component, the second input, or corresponding register value, is subtracted from the first input, or DC component value 172. The plurality of registers are then initialized to contain the DC component input value 172.

Figure 10:
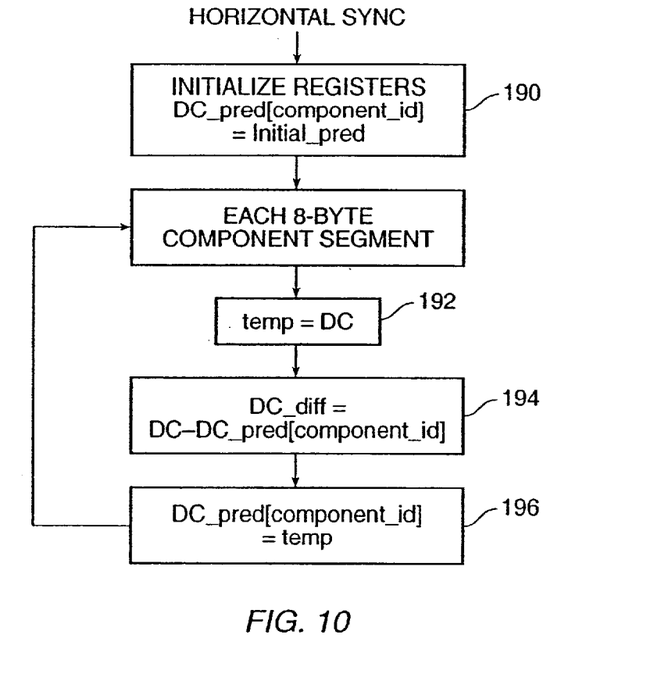
FIG. 10 is a flow diagram illustrating the DC adjustment performed according to a presently preferred embodiment of the present invention.

The DC adjustment process is illustrated in FIG. 10. The horizontal sync signal indicates the start of a new line. At step 190, each one of the plurality of registers is initialized. For each 8-byte component segment, steps 192–196 are performed. At step 192, the most recent DC component value is assigned to a temporary memory location. Next, at step 194, the register value corresponding to the Y, U, or V component is subtracted from the most recent DC component value and sent to the DC_MUX 160. At step 196, the value stored in the temporary memory location is stored in the register corresponding to the Y, U, or V component. For example, the component_id 0, 1, and 2 may be provided for components Y, U, and V, respectively. A state machine may provide the component_id in the sequence of {0, 1, 0, 2, 0, 1, 0, 2, . . . } where the Huffman encoding block will process each scanline on an 8-pixel basis in the order of Y, U, Y, V, Y, U, Y, V . . . . However, one of ordinary skill in the art will readily recognize that components may be received in an alternative order.

Figure 11:
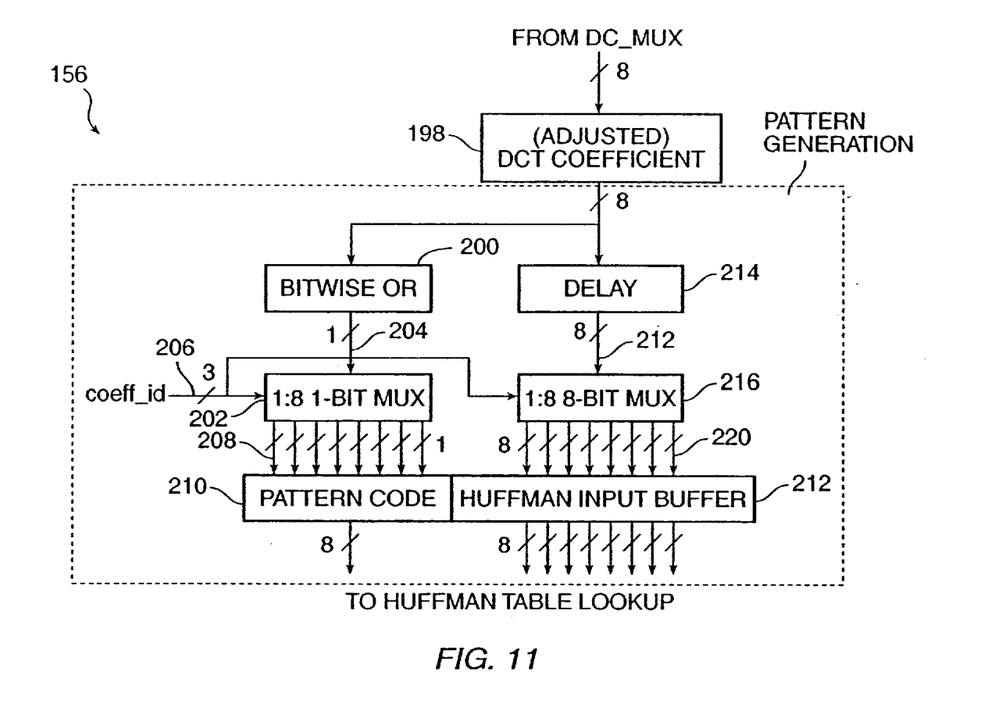
FIG. 11 illustrates a pattern code generation module of the Huffman Encoder according to a presently preferred embodiment of the present invention.

Referring now to FIG. 11, pattern code generation means according to a presently preferred embodiment of the present invention is illustrated. A plurality of DCT coefficients are generated by the DCT module. A pattern code is then generated for each of the plurality of DCT coefficients to identify which coefficients are coded, since only the nonzero coefficients are coded. The pattern code generated includes a plurality of bits, each one of the plurality of bits corresponding to one of the plurality of DCT coefficients. According to a presently preferred embodiment of the present invention, each one of the plurality of bits is 0 when the DCT coefficient is 0. In all other instances, the corresponding bit is 1. This pattern code may be generated by performing a bitwise OR operation for each one of the plurality of DCT coefficients.

According to a presently preferred embodiment of the present invention, an adjusted DCT coefficient 198 is provided by the multiplexer DC_MUX. A bitwise OR operation 200 is performed on the adjusted DCT coefficient 198 to produce an output comprising one of the plurality of bits in the pattern code. A 1:n 1-bit MUX 202 having an input 204, a plurality of select lines 206, and n outputs 208 is provided. According to a presently preferred embodiment, for each 8 bytes of DCT coefficient, a pattern code byte 210 will be generated. Therefore, the 1:n MUX 202 comprises a 1:8 MUX to accommodate 8 DCT coefficients and a corresponding 8 bit pattern code. The output of the bitwise OR operation 200 is operatively coupled to the 1:8 1-bit MUX 202. A coefficient id is operatively coupled to the 1:8 1-bit MUX and 1:8 8-bit MUX select lines 206 for selecting which one of 8 coefficients is to be processed. The output of the bitwise OR operation 200 is then placed in the corresponding bit in the pattern code 210.

The adjusted DCT coefficient is similarly stored in a corresponding byte in an n byte Huffman Input Buffer 212. A delay 214 of one clock is provided for synchronization with the pattern code generation. A 1:n MUX n-bit 216 having an input 218, n outputs 220, and a plurality of select lines 206 coupled to the coefficient id is provided for storing the adjusted DCT coefficient in the Huffman Input Buffer 212. According to a presently preferred embodiment of the present invention, the MUX 216 comprises a 1:8 8-bit MUX. The adjusted DCT coefficient 198 is passed through the input of the 8-bit MUX 216 to a byte in the n byte Huffman Input Buffer 212 corresponding to the coefficient id.

Figure 12:
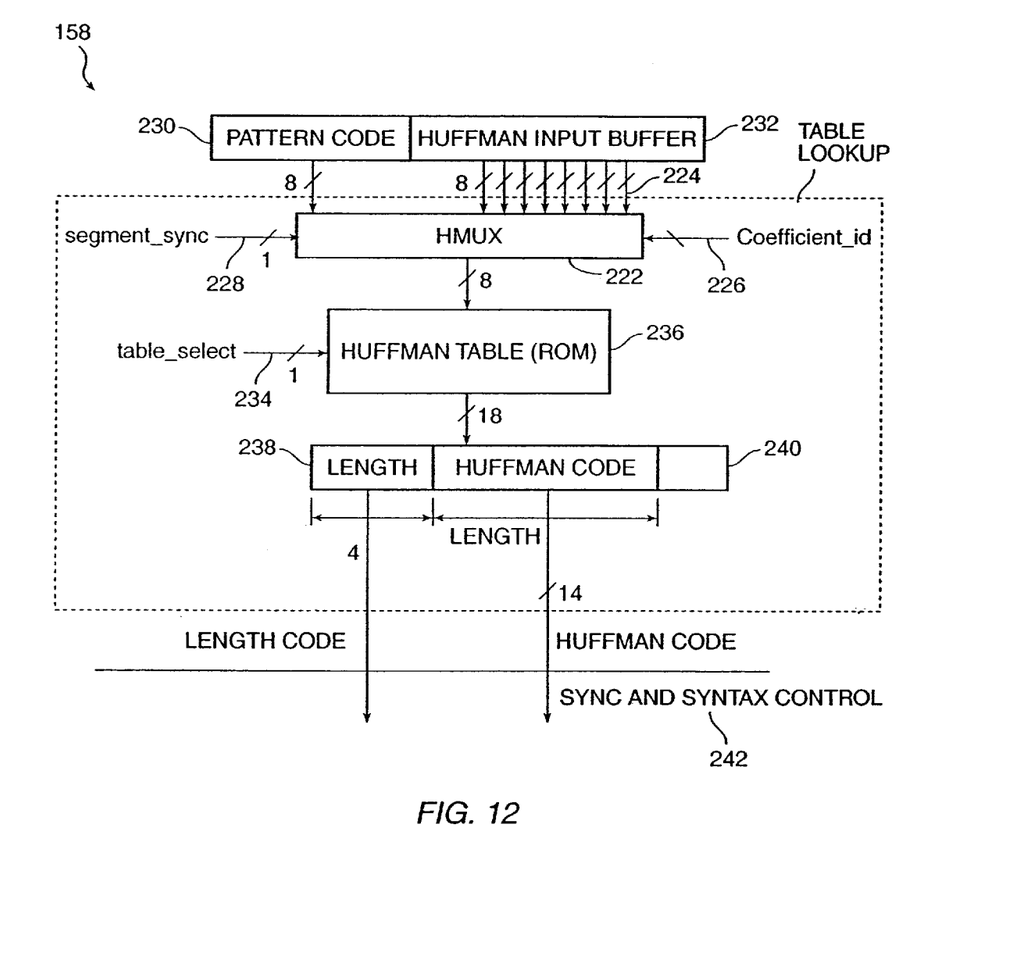
FIG. 12 illustrates a table lookup module of the Huffman Encoder according to a presently preferred embodiment of the present invention.

Referring now to FIG. 12, a Table Lookup module, or table lookup means, for Huffman-coding the pattern code and DCT coefficients according to a presently preferred embodiment of the present invention is shown. A coefficient table is prepared including a plurality of code pairs, each of the plurality of pairs having a length code and a Huffman code. A pattern table is prepared including a plurality of code pairs, each of the plurality of pairs having a length code and a Huffman code. A multiplexer HMUX 222 having a plurality of inputs 224 operatively coupled to the pattern code and the Huffman Input Buffer, a plurality of select lines 226 coupled to the coefficient id and a selection bit 228 for selecting a pattern code 230 or a DCT coefficient 232 for Huffman coding, and an output is provided. According to a presently preferred embodiment of the present invention, the selection bit 228 indicates the start of the 1 byte pattern code 230 and 8 bytes of DCT coefficients 232 which form a segment. The pattern code 230 is operatively coupled to a first one of the plurality of inputs and each of the DCT coefficients in the Huffman Input Buffer 232 are operatively coupled to a different one of the plurality of inputs. When the selection bit 228 is in a first state, the pattern code 230 is passed through to the multiplexer 222 output. When the selection bit 228 is in a second state, one of the plurality of bytes in the Huffman Input Buffer 232 corresponding to the coefficient id 226 is passed through to the multiplexer 222 output. Nonzero DCT coefficients are then identified using the pattern code. Table select 234 selects a pattern table or coefficient table. When the timing condition coincides, the selection bit 228 and table select 234 can be made the same signal. Thus, when the selection bit, or table select 234, is in the second state, a table lookup 236 is performed for each non-zero DCT coefficient within the coefficient table to Huffman encode the non-zero DCT coefficient. Each zero DCT coefficient is encoded with zero bits, meaning that the coefficient is skipped in the bitstrean. However, the pattern code is always coded and transmitted. When the selection bit, or table select 234, is in the first state, a table lookup 236 is performed for the pattern code within the pattern table to Huffman encode the pattern code. According to a presently preferred embodiment, Huffman encoding of the pattern code and DCT coefficients produces a 4 bit length code 238 and a 14 bit Huffman code 240. The length and Huffman code for a zero DCT coefficient are zero. The Huffman encoded pattern code and DCT coefficients are then sent to a Sync and Syntax control block 242.

The sync and syntax control block provides control logic for sending each Huffman Code to a USB FIFO buffer. The sync and control block provides a line dropping mechanism, a state machine, and a data multiplexer. The line dropping mechanism drops a line if the USB FIFO almost full condition is true and the current line is an even line. Thus, a Y line is dropped to prevent the USB FIFO buffer from becoming full and allowing incoming data to be discarded. For example, the USB FIFO almost full condition may be true if the USB FIFO has less than 256 bytes of free space.

The state machine and data multiplexer provide a compressed bitstream to the USB interface from the Huffman-Encoder. If the compressed bitstream does not lie on a byte boundary, the bitstream is stuffed with 1's. The resulting bitstream is then output to the USB Bus.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for simultaneously performing vertical scaling and 4:2:2 to 4:2:0 color format conversion on incoming color space component data of a video frame, the incoming color space component data having first color space component data, second color space component data, and third color space component data, the method comprising the following steps:

- separating each byte of the first, second, and third color space component data;
- determining a scaling factor, the scaling factor indicating a number of bytes to average;
- first performing an f:1 scale down for each byte of the first color space component data when the scaling factor is equal to f, the f:1 scale down calculations being performed in a color space;
- second performing a 2f:1 scale down for each byte of the second and third color space component data when the scaling factor is equal to f the 2f:1 scale down calculations being performed in the color space.

2. The method according to claim 1, wherein the first performing step is performed when f is an integer greater than 1.

3. A method for simultaneously performing vertical scaling and 4:2:2 to 4:2:0 color format conversion on incoming Y, U, and V data of a video frame, the method comprising the following steps:

- separating each byte of the Y, U, and V data;
- determining a scaling factor, the scaling factor indicating a number of bytes to average;
- first performing an f:1 scale down for each Y byte when the scaling factor is equal to f, the f:1 scale down calculations being performed in a color space;
- second performing a 2f:1 scale down for each U and V byte when the scaling factor is equal to f, the 2f:1 scale down calculations being performed in the color space.

4. The method according to claim 3, wherein the first performing step is performed when f is an integer greater than 1.

5. A method for simultaneously performing vertical scaling and 4:2:2 to 4:2:0 color format conversion on incoming 4:2:2 color space component data of a video frame, the incoming color space component data having first color space component data, second color space component data, and third color space component data, the method comprising the following steps:

- separating the incoming 4:2:2 color space component data into the first color space component data, the second color space component data, and the third color space component data;
- first performing vertical scaling on the first color space component data, the second color space component data, and the third color space component data, the vertical scaling calculations being performed in a color space; and
- second performing 4:2:2 to 4:2:0 color format conversion on the first color space component data, the second color space component data, and the third color space component data, the second performing step being executed simultaneous with the first performing step the color format conversion calculations being performed in the color space.

6. The method according to claim 5, the video frame having a plurality of horizontal scan lines, the method being performed in response to a signal indicating a start of a new horizontal scan line.

7. A method for simultaneously performing vertical scaling and 4:2:2 to 4:2:0 color format conversion on incoming 4:2:2 color space component data of a video frame, the incoming color space component data having first color space component data, second color space component data, and third color space component data, the method comprising the following steps:

- separating the incoming 4:2:2 color space component data into the first color space component data, the second color space component data, and the third color space component data;
- multiplexing the first, second, and third color space component data to allow one of the first, second, and third color space component data to be scaled;
- horizontally scaling the multiplexed color space component data;
- first performing vertical scaling on the first color space component data, the second color space component data, and the third color space component data; and
- second performing 4:2:2 to 4:2:0 color format conversion on the first color space component data, the second color space component data, and the third color space component data, the second performing step being executed simultaneous with the first performing step.

* * * * *